(12) United States Patent
Jung et al.

(10) Patent No.: US 12,197,787 B2
(45) Date of Patent: Jan. 14, 2025

(54) STORAGE DEVICE DETERMINING MEMORY AREA TO WHICH DATA IS WRITTEN USING WRITE THROUGHPUT AND METHOD OF OPERATION

(71) Applicant: SK hynix Inc., Icheon-si (KR)

(72) Inventors: Hoe Seung Jung, Icheon-si (KR); Do Hyung Kim, Icheon-si (KR); Joo Young Lee, Icheon-si (KR); Sung Kwan Hong, Icheon-si (KR)

(73) Assignee: SK hynix Inc., Icheon-si (KR)

( * ) Notice: Subject to any disclaimer, the term of this patent is extended or adjusted under 35 U.S.C. 154(b) by 0 days.

(21) Appl. No.: 18/306,163

(22) Filed: Apr. 24, 2023

(65) Prior Publication Data

US 2024/0184486 A1    Jun. 6, 2024

(30) Foreign Application Priority Data

Dec. 2, 2022   (KR) .................. 10-2022-0166341

(51) Int. Cl.
*G06F 3/06*    (2006.01)
(52) U.S. Cl.
CPC ............ *G06F 3/0659* (2013.01); *G06F 3/061* (2013.01); *G06F 3/064* (2013.01); *G06F 3/0679* (2013.01)

(58) Field of Classification Search
None
See application file for complete search history.

(56) References Cited

U.S. PATENT DOCUMENTS

| | | | |
|---|---|---|---|
| 2012/0324178 A1* | 12/2012 | Yoon | G11C 16/3454 711/E12.001 |
| 2016/0335001 A1* | 11/2016 | Heller | G06F 3/0655 |
| 2019/0227751 A1* | 7/2019 | Khakifirooz | G11C 11/5628 |
| 2021/0011642 A1* | 1/2021 | Lee | G06F 3/0659 |
| 2022/0129168 A1 | 4/2022 | Tanpairoj et al. | |

FOREIGN PATENT DOCUMENTS

| | | |
|---|---|---|
| KR | 10-2021-0004503 A | 1/2021 |
| KR | 10-2021-0006102 A | 1/2021 |

* cited by examiner

*Primary Examiner* — Yaima Rigol

(57) ABSTRACT

A storage device may determine write throughput based on a plurality of write commands received from the outside of the storage device, and write target data write-requested from the outside to a first memory area including one or more of a plurality of first type memory blocks or a second memory area including one or more of a second type memory blocks according to whether the write throughput is greater than or equal to a threshold throughput. The first type memory blocks may operate at a higher speed than the second type memory blocks.

11 Claims, 11 Drawing Sheets

(write performance value of TGT_WR_CMD_1) = ((W1) / (T1 − T2))

(write throughput) = (W1 + W2 + ⋯ + Wx) / (REF_TIME)

REF_TIME : map update period / superblock allocation period

STORAGE DEVICE DETERMINING MEMORY AREA TO WHICH DATA IS WRITTEN USING WRITE THROUGHPUT AND METHOD OF OPERATION

CROSS-REFERENCES TO RELATED APPLICATION

The present application claims priority under 35 U.S.C. § 119(a) to Korean patent application number 10-2022-0166341 filed in the Korean Intellectual Property Office on Dec. 2, 2022, which is incorporated herein by reference in its entirety.

BACKGROUND

1. Technical Field

Various embodiments generally relate to a storage device determining memory area to which data is to be written based on write throughput and methods of operating the storage device.

2. Related Art

A storage device is a device that stores data on the basis of a request of an external device such as a computer, a mobile terminal like a smartphone or a tablet, and various other electronic devices.

The storage device may include a controller for controlling a memory (e.g., a volatile memory or a nonvolatile memory). The controller may receive a command from the external device, and may execute or control an operation for reading, writing or erasing data with respect to the memory included in the storage device, consistent with the received command.

The external device may request the storage device to write data faster. In order to write the data faster, the storage device may write the data to a memory block operating at a higher speed from among memory blocks included in the memory.

SUMMARY

Various embodiments are directed to a storage device capable of preventing performance degradation and lifetime reduction due to unnecessary garbage collection, and methods of operating the storage device.

In an embodiment, a storage device may include i) a memory including a plurality of first type memory blocks and a plurality of second type memory blocks, and ii) a controller configured to determine write throughput based on a plurality of write commands received from the outside of the storage device, write target data requested from the outside into a first memory area including one or more of the first type memory blocks when the write throughput is greater than or equal to a set threshold throughput, and write the target data into a second memory area including one or more of the second type memory blocks when the write throughput is less than the threshold throughput. In this case, the first type memory blocks may operate at a higher speed than the second type memory blocks.

In an embodiment, a method for operating a storage device may include (i) determining write throughput based on a plurality of write commands received from the outside of the storage device, (ii) determining whether the write throughput is greater than or equal to a set threshold throughput, and (iii) writing, based on whether the write throughput is greater than or equal to the threshold throughput, target data requested from the outside into a first memory area including one or more of a plurality of first type memory blocks or a second memory area including one or more of a plurality of second type memory blocks. In this case, the first type memory blocks may operate at a higher speed than the second type memory blocks.

In an embodiment, a controller may include (i) a memory interface configured to communicate with memory including a plurality of SLC memory blocks and a plurality of TLC memory blocks and (ii) a control circuit configured to determine write throughput based on all or some of a plurality of write commands received from a host, write data requested by the host to one or more of the SLC memory blocks when the write throughput is greater than or equal to a set threshold throughput, and write data requested by the host to one or more of the TLC memory blocks when the write throughput is less than the threshold throughput.

According to the embodiments of the disclosure, it is possible to prevent performance degradation and lifetime reduction due to unnecessary garbage collection, and method of operating the storage device.

DETAIL DESCRIPTION OF THE EXEMPLARY EMBODIMENTS

Figure 1:
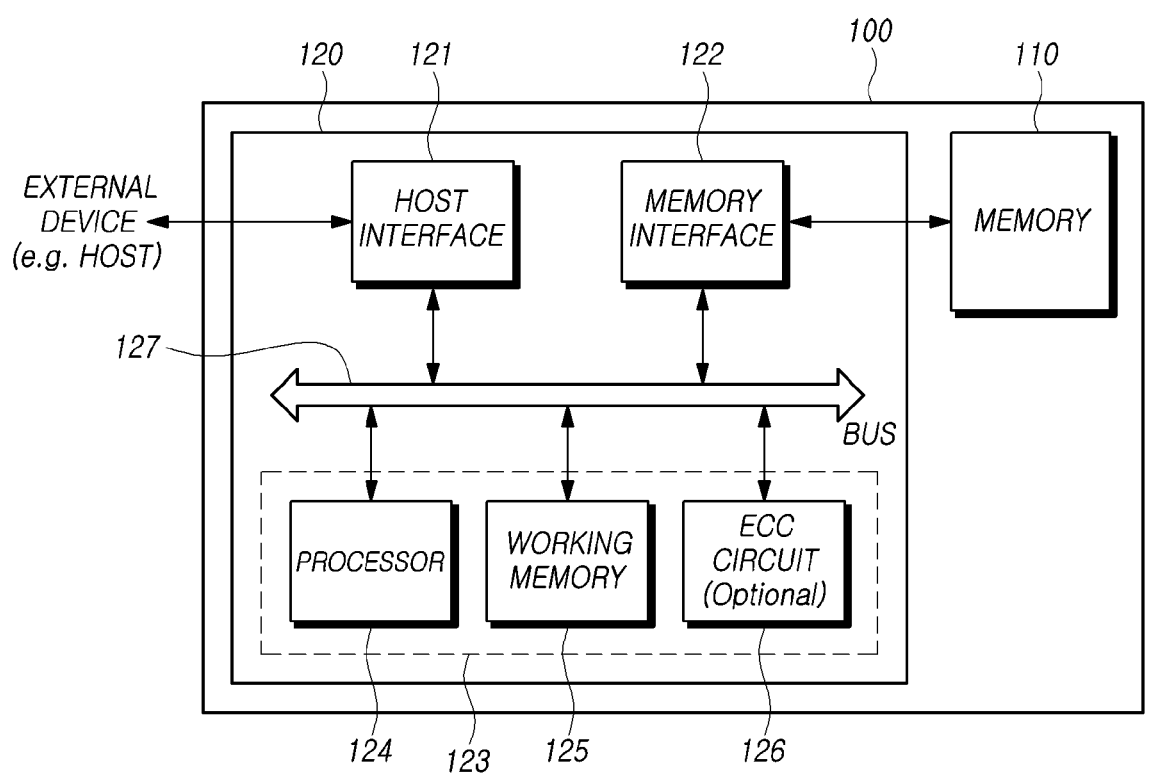
FIG. 1 is a schematic configuration diagram of a storage device according to an embodiment of the disclosure.

Hereinafter, embodiments of the present disclosure are described in detail with reference to the accompanying drawings. Throughout the specification, reference to "an embodiment," "another embodiment" or the like is not necessarily to only one embodiment, and different references to any such phrase are not necessarily limited to the same embodiment(s). The term "embodiments" when used herein does not necessarily refer to all embodiments.

Various embodiments of the present invention are described below in more detail with reference to the accompanying drawings. However, the present invention may be embodied in different forms and variations, and should not be construed as being limited to the embodiments set forth herein. Rather, the described embodiments are provided so that this disclosure will be thorough and complete, and will fully convey the present invention to those skilled in the art to which this invention pertains. Throughout the disclosure, like reference numerals refer to like parts throughout the various figures and embodiments of the present invention.

The methods, processes, and/or operations described herein may be performed by code or instructions to be executed by a computer, processor, controller, or other signal processing device. The computer, processor, controller, or other signal processing device may be those described herein or one in addition to the elements described herein. Because the algorithms that form the basis of the methods (or operations of the computer, processor, controller, or other signal processing device) are described in detail, the code or instructions for implementing the operations of the method embodiments may transform the computer, processor, controller, or other signal processing device into a special-purpose processor for performing methods herein.

When implemented at least partially in software, the controllers, processors, devices, modules, units, multiplexers, logic, interfaces, decoders, drivers, generators and other signal generating and signal processing features may include, for example, a memory or other storage device for storing code or instructions to be executed, for example, by a computer, processor, microprocessor, controller, or other signal processing device.

FIG. 1 is a schematic configuration diagram of a storage device according to an embodiment of the disclosure.

Referring to FIG. 1, a storage device 100 may include a memory 110 that stores data and a controller 120 that controls the memory 110.

The memory 110 includes a plurality of memory blocks, and operates in response to the control of the controller 120. Operations of the memory 110 may include, for example, a read operation, a program operation (also referred to as a write operation) and an erase operation.

The memory 110 may include a memory cell array including a plurality of memory cells (also simply referred to as "cells") that store data. Such a memory cell array may exist in a memory block.

For example, the memory 110 may be realized in various types of memory such as a DDR SDRAM (double data rate synchronous dynamic random access memory), an LPDDR4 (low power double data rate 4) SDRAM, a GDDR (graphics double data rate) SDRAM, an LPDDR (low power DDR), an RDRAM (Rambus dynamic random access memory), a NAND flash memory, a 3D NAND flash memory, a NOR flash memory, a resistive random access memory (RRAM), a phase-change memory (PRAM), a magnetoresistive random access memory (MRAM), a ferroelectric random access memory (FRAM) and a spin transfer torque random access memory (STT-RAM).

The memory 110 may be implemented as a three-dimensional array structure. For example, embodiments of the disclosure may be applied to a charge trap flash (CTF) in which a charge storage layer is configured by a dielectric layer and a flash memory in which a charge storage layer is configured by a conductive floating gate.

The memory 110 may receive a command and an address from the controller 120 and may access an area in the memory cell array that is selected by the address. In other words, the memory 110 may perform an operation indicated by the command, on the area selected by the address.

The memory 110 may perform a program operation, a read operation or an erase operation. For example, when performing the program operation, the memory 110 may program data to the area selected by the address. When performing the read operation, the memory 110 may read data from the area selected by the address. In the erase operation, the memory 110 may erase data stored in the area selected by the address.

The controller 120 may control write (program), read, erase and background operations for the memory 110. For example, background operations may include at least one from among a garbage collection (GC) operation, a wear leveling (WL) operation, a read reclaim (RR) operation, a bad block management (BBM) operation, and so forth.

The controller 120 may control the operation of the memory 110 according to a request from a device (e.g., a host) located outside the storage device 100. The controller 120, however, also may control the operation of the memory 110 regardless or in the absence of a request of the host.

The host may be a computer, an ultra mobile PC (UMPC), a workstation, a personal digital assistant (PDA), a tablet, a mobile phone, a smartphone, an e-book, a portable multimedia player (PMP), a portable game player, a navigation device, a black box, a digital camera, a digital multimedia broadcasting (DMB) player, a smart television, a digital audio recorder, a digital audio player, a digital picture recorder, a digital picture player, a digital video recorder, a digital video player, a storage configuring a data center, one of various electronic devices configuring a home network, one of various electronic devices configuring a computer network, one of various electronic devices configuring a telematics network, an RFID (radio frequency identification) device, and a mobility device (e.g., a vehicle, a robot or a drone) capable of driving under human control or autonomous driving, as non-limiting examples.

The host may include at least one operating system (OS). The operating system may generally manage and control the function and operation of the host, and may provide interoperability between the host and the storage device 100. The operating system may be classified into a general operating system and a mobile operating system depending on the mobility of the host.

The controller 120 and the host may be devices that are separated from each other, or the controller 120 and the host may be integrated into one device. Hereunder, for the sake of convenience in explanation, descriptions will describe the controller 120 and the host as devices that are separated from each other.

Referring to FIG. 1, the controller 120 may include a memory interface 122 and a control circuit 123, and may further include a host interface 121.

The host interface 121 provides an interface for communication with the host. For example, the host interface 121 provides an interface that uses at least one from among various interface protocols such as a USB (universal serial bus) protocol, an MMC (multimedia card) protocol, a PCI (peripheral component interconnection) protocol, a PCI-E (PCI-express) protocol, an ATA (advanced technology attachment) protocol, a serial-ATA protocol, a parallel-ATA protocol, an SCSI (small computer system interface) protocol, an ESDI (enhanced small disk interface) protocol, an IDE (integrated drive electronics) protocol and a private protocol.

When receiving a command from the host, the control circuit 123 may receive the command through the host interface 121, and may perform an operation of processing the received command.

The memory interface 122 may be coupled with the memory 110 to provide an interface for communication with the memory 110. That is to say, the memory interface 122 may be configured to provide an interface between the memory 110 and the controller 120 in response to the control of the control circuit 123.

The control circuit 123 performs the general control operations of the controller 120 to control the operation of the memory 110. To this end, for instance, the control circuit 123 may include at least one of a processor 124 and a working memory 125, and may optionally include an error detection and correction circuit (ECC circuit) 126.

The processor 124 may control general operations of the controller 120, and may perform a logic calculation. The processor 124 may communicate with the host through the host interface 121, and may communicate with the memory 110 through the memory interface 122.

The processor 124 may perform the function of a flash translation layer (FTL). The processor 124 may translate a logical block address (LBA), provided by the host, into a physical block address (PBA) through the flash translation layer (FTL). The flash translation layer (FTL) may receive the logical block address (LBA) and translate the logical block address (LBA) into the physical block address (PBA), by using a mapping table.

There are various address mapping methods of the flash translation layer, depending on a mapping unit. Representative address mapping methods include a page mapping method, a block mapping method and a hybrid mapping method.

The processor 124 may randomize data received from the host. For example, the processor 124 may randomize data received from the host by using a set randomizing seed. The randomized data may be provided to the memory 110, and may be programmed to a memory cell array of the memory 110.

In a read operation, the processor 124 may derandomize data received from the memory 110. For example, the processor 124 may derandomize data received from the memory 110 by using a derandomizing seed. The derandomized data may be outputted to the host.

The processor 124 may execute firmware to control the operation of the controller 120. Namely, in order to control the general operation of the controller 120 and perform a logic calculation, the processor 124 may execute (drive) firmware loaded in the working memory 125 upon booting. Hereafter, embodiments of an operation of the storage device 100 will be described as implementing a processor 124 that executes firmware in which the corresponding operation is defined.

Firmware, as a program to be executed in the storage device 100 to drive the storage device 100, may include various functional layers. For example, the firmware may include binary data in which codes for executing the functional layers, respectively, are defined.

For example, the firmware may include at least one from among a flash translation layer (FTL), which performs a translating function between a logical address requested to the storage device 100 from the host and a physical address of the memory 110; a host interface layer (HIL), which serves to analyze a command requested to the storage device 100 as a storage device from the host and transfer the command to the flash translation layer (FTL); and a flash interface layer (FIL), which transfers a command, instructed from the flash translation layer (FTL), to the memory 110.

Such firmware may be loaded in the working memory 125 from, for example, the memory 110 or a separate nonvolatile memory (e.g., a ROM or a NOR Flash) located outside the memory 110. The processor 124 may first load all or a part of the firmware in the working memory 125 when executing a booting operation after power-on.

The processor 124 may perform a logic calculation, which is defined in the firmware loaded in the working memory 125, to control the general operation of the controller 120. The processor 124 may store a result of performing the logic calculation defined in the firmware, in the working memory 125. The processor 124 may control the controller 120 according to a result of performing the logic calculation defined in the firmware such that the controller 120 generates a command or a signal. When a part of firmware, in which a logic calculation to be performed is defined, is stored in the memory 110, but not loaded in the working memory 125, the processor 124 may generate an event (e.g., an interrupt) for loading the corresponding part of the firmware into the working memory 125 from the memory 110.

The processor 124 may load metadata necessary for driving firmware from the memory 110. The metadata, as data for managing the memory 110, may include for example management information on user data stored in the memory 110.

Firmware may be updated while the storage device 100 is manufactured or while the storage device 100 is operating. The controller 120 may download new firmware from the outside of the storage device 100 and update existing firmware with the new firmware.

To drive the controller 120, the working memory 125 may store necessary firmware, a program code, a command and data. The working memory 125 may be a volatile memory that includes, for example, at least one from among an SRAM (static RAM), a DRAM (dynamic RAM) and an SDRAM (synchronous DRAM).

The error detection and correction circuit 126 may detect an error bit of target data, and correct the detected error bit by using an error correction code. The target data may be, for example, data stored in the working memory 125 or data read from the memory 110.

The error detection and correction circuit 126 may decode data by using an error correction code. The error detection and correction circuit 126 may be realized by various code decoders. For example, a decoder that performs unsystematic code decoding or a decoder that performs systematic code decoding may be used.

For example, the error detection and correction circuit 126 may detect an error bit by the unit of a set sector in each of read data, when each read data is constituted by a plurality of sectors. A sector may mean a data unit that is smaller than a page, which is the read unit of a flash memory. Sectors constituting each read data may be matched with one another using an address.

The error detection and correction circuit 126 may calculate a bit error rate (BER), and may determine whether an error is correctable or not, by sector units. For example, when a bit error rate (BER) is higher than a reference value, the error detection and correction circuit 126 may determine that a corresponding sector is uncorrectable or a fail. On the other hand, when a bit error rate (BER) is lower than the reference value, the error detection and correction circuit 126 may determine that a corresponding sector is correctable or a pass.

The error detection and correction circuit 126 may perform an error detection and correction operation sequentially for all read data. In the case where a sector included in read data is correctable, the error detection and correction circuit 126 may omit an error detection and correction operation for a corresponding sector for next read data. If the error detection and correction operation for all read data is ended in this way, then the error detection and correction circuit 126 may detect a sector that is uncorrectable in read data last. There may be one or more sectors that are determined to be uncorrectable. The error detection and correction circuit 126 may transfer information (e.g., address information) regarding a sector that is determined to be uncorrectable to the processor 124.

A bus 127 may be configured to provide channels among the components 121, 122, 124, 125 and 126 of the controller 120. The bus 127 may include, for example, a control bus for transferring various control signals, commands and the like, a data bus for transferring various data, and so forth.

Some of the components among the above-described components 121, 122, 124, 125 and 126 of the controller 120 may be omitted, or some of the components among the above-described components 121, 122, 124, 125 and 126 of the controller 120 may be integrated into one component. In addition to the above-described components 121, 122, 124, 125 and 126 of the controller 120, one or more other components may be added.

Hereinbelow, the memory 110 will be described in further detail with reference to FIG. 2.

Figure 2:
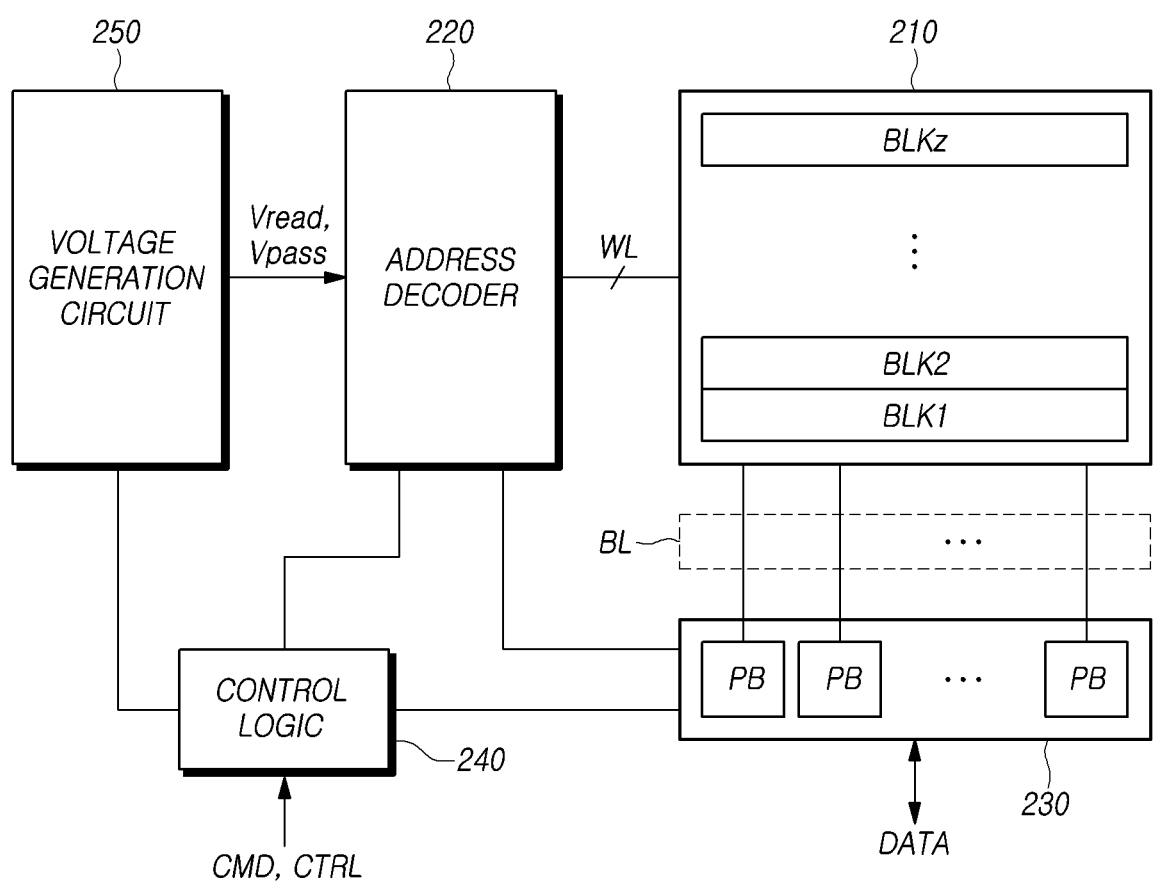
FIG. 2 is a block diagram schematically illustrating a memory of FIG. 1.

FIG. 2 is a block diagram schematically illustrating a memory of FIG. 1.

Referring to FIG. 2, a memory 110 may include a memory cell array 210, an address decoder 220, a read and write circuit 230, a control logic 240, and a voltage generation circuit 250.

The memory cell array 210 may include a plurality of memory blocks BLK1 to BLKz (where z is a natural number of 2 or greater).

In the plurality of memory blocks BLK1 to BLKz, a plurality of word lines WL and a plurality of bit lines BL may be disposed, and a plurality of memory cells (MC) may be arranged.

The plurality of memory blocks BLK1 to BLKz may be coupled with the address decoder 220 through the plurality of word lines WL. The plurality of memory blocks BLK1 to BLKz may be coupled with the read and write circuit 230 through the plurality of bit lines BL.

Each of the plurality of memory blocks BLK1 to BLKz may include a plurality of memory cells. For example, the plurality of memory cells may be nonvolatile memory cells, and may be configured by nonvolatile memory cells that have vertical channel structures.

The memory cell array 210 may be configured by a memory cell array of a two-dimensional structure or may be configured by a memory cell array of a three-dimensional structure.

Each of the plurality of memory cells included in the memory cell array 210 may store at least 1-bit data. For instance, each of the plurality of memory cells included in the memory cell array 210 may be a single level cell (SLC) that stores 1-bit data. In another instance, each of the plurality of memory cells included in the memory cell array 210 may be a multi-level cell (MLC) that stores 2-bit data. In still another instance, each of the plurality of memory cells included in the memory cell array 210 may be a triple level cell (TLC) that stores 3-bit data. In yet another instance, each of the plurality of memory cells included in the memory cell array 210 may be a quad level cell (QLC) that stores 4-bit data. In a further instance, the memory cell array 210 may include a plurality of memory cells, each of which stores 5 or more-bit data.

The number of bits of data stored in each of the plurality of memory cells may be dynamically determined. For example, a single-level cell that stores 1-bit data may be changed to a triple-level cell that stores 3-bit data.

Referring to FIG. 2, the address decoder 220, the read and write circuit 230, the control logic 240 and the voltage generation circuit 250 may operate as a peripheral circuit that drives the memory cell array 210.

The address decoder 220 may be coupled to the memory cell array 210 through the plurality of word lines WL.

The address decoder 220 may be configured to operate in response to the control of the control logic 240.

The address decoder 220 may receive an address through an input/output buffer in the memory 110. The address decoder 220 may be configured to decode a block address in the received address. The address decoder 220 may select at least one memory block depending on the decoded block address.

The address decoder 220 may receive a read voltage Vread and a pass voltage Vpass from the voltage generation circuit 250.

The address decoder 220 may apply the read voltage Vread to a selected word line WL in a selected memory block during a read operation, and may apply the pass voltage Vpass to the remaining unselected word lines WL.

The address decoder 220 may apply a verify voltage generated in the voltage generation circuit 250 to a selected word line WL in a selected memory block in a program verify operation, and may apply the pass voltage Vpass to the remaining unselected word lines WL.

The address decoder 220 may be configured to decode a column address in the received address. The address decoder 220 may transmit the decoded column address to the read and write circuit 230.

A read operation and a program operation of the memory 110 may be performed by the unit of a page. An address received when a read operation or a program operation is requested may include at least one from among a block address, a row address and a column address.

The address decoder 220 may select one memory block and one word line WL depending on a block address and a row address. A column address may be decoded by the address decoder 220 and be provided to the read and write circuit 230.

The address decoder 220 may include at least one from among a block decoder, a row decoder, a column decoder and an address buffer.

The read and write circuit 230 may include a plurality of page buffers PB. The read and write circuit 230 may operate as a read circuit in a read operation of the memory cell array 210, and may operate as a write circuit in a write operation of the memory cell array 210.

The read and write circuit 230 described above may also be referred to as a page buffer circuit or a data register circuit that includes a plurality of page buffers PB. The read and write circuit 230 may include data buffers that take charge of a data processing function, and may further include cache buffers that take charge of a caching function.

The plurality of page buffers PB may be coupled to the memory cell array 210 through the plurality of bit lines BL.

The plurality of page buffers PB may continuously supply sensing current to bit lines BL coupled with memory cells to sense threshold voltages (Vth) of the memory cells in a read operation and a program verify operation, and may latch sensing data by sensing, through sensing nodes, changes in the amounts of current flowing, depending on the programmed states of the corresponding memory cells.

The read and write circuit 230 may operate in response to page buffer control signals outputted from the control logic 240.

In a read operation, the read and write circuit 230 temporarily stores read data by sensing data of memory cells, and then, outputs data DATA to the input/output buffer of the memory 110. As an exemplary embodiment, the read and write circuit 230 may include a column select circuit in addition to the page buffers PB or the page registers.

The control logic 240 may be coupled with the address decoder 220, the read and write circuit 230 and the voltage generation circuit 250. The control logic 240 may receive a command CMD and a control signal CTRL through the input/output buffer of the memory 110.

The control logic 240 may be configured to control general operations of the memory 110 in response to the control signal CTRL. The control logic 240 may output control signals for adjusting the precharge potential levels of the sensing nodes of the plurality of page buffers PB.

The control logic 240 may control the read and write circuit 230 to perform a read operation of the memory cell array 210. The voltage generation circuit 250 may generate the read voltage Vread and the pass voltage Vpass used in a read operation, in response to a voltage generation circuit control signal outputted from the control logic 240.

Each memory block of the memory 110 described above may be configured by a plurality of pages corresponding to a plurality of word lines WL and a plurality of strings corresponding to a plurality of bit lines BL.

In a memory block BLK, a plurality of word lines WL and a plurality of bit lines BL may be disposed to intersect with each other. For example, each of the plurality of word lines WL may be disposed in a row direction, and each of the plurality of bit lines BL may be disposed in a column direction. For another example, each of the plurality of word lines WL may be disposed in a column direction, and each of the plurality of bit lines BL may be disposed in a row direction.

A memory cell may be coupled to one of the plurality of word lines WL and one of the plurality of bit lines BL. A transistor may be disposed in each memory cell.

For example, a transistor disposed in each memory cell (MC) may include a drain, a source and a gate. The drain (or source) of the transistor may be coupled with a corresponding bit line BL directly or via another transistor. The source (or drain) of the transistor may be coupled with a source line (which may be the ground) directly or via another transistor. The gate of the transistor may include a floating gate, which is surrounded by a dielectric, and a control gate to which a gate voltage is applied from a word line WL.

In each memory block, a first select line (also referred to as a source select line or a drain select line) may be additionally disposed outside a first outermost word line more adjacent to the read and write circuit 230 between two outermost word lines, and a second select line (also referred to as a drain select line or a source select line) may be additionally disposed outside a second outermost word line between the two outermost word lines.

At least one dummy word line may be additionally disposed between the first outermost word line and the first select line. At least one dummy word line may also be additionally disposed between the second outermost word line and the second select line.

A read operation and a program operation (write operation) of the memory block described above may be performed by the unit of a page, and an erase operation may be performed by the unit of a memory block.

Figure 3:
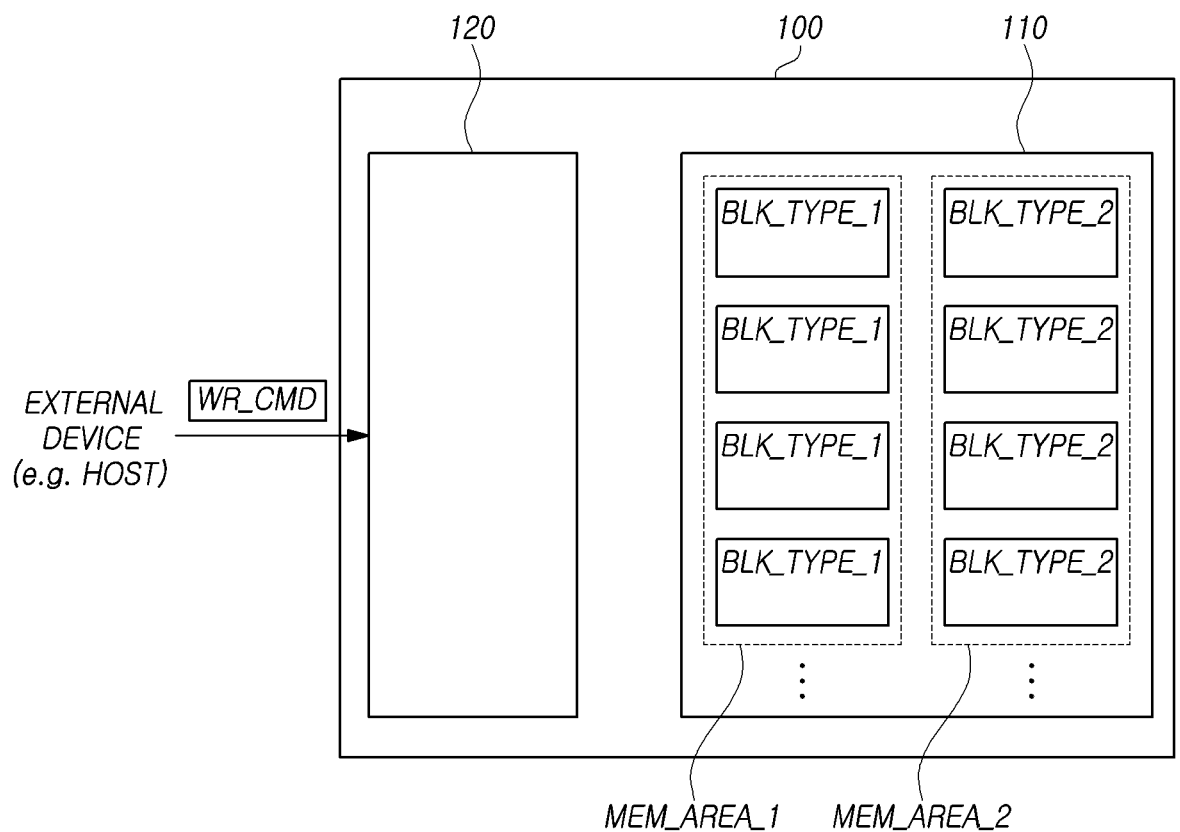
FIG. 3 is a diagram illustrating a structure of a storage device according to an embodiment of the disclosure.

FIG. 3 is a diagram illustrating a structure of a storage device according to an embodiment of the disclosure.

Referring to FIG. 3, a storage device 100 may include a memory 110 and a controller 120.

The memory 110 may include a plurality of first type memory blocks BLK_TYPE_1 and a plurality of second type memory blocks BLK_TYPE_2. The first type memory blocks BLK_TYPE_1 and the second type memory blocks BLK_TYPE_2 may be included in the memory blocks described with reference to FIG. 1.

The first type memory blocks BLK_TYPE_1 may operate at a higher speed than the second type memory blocks BLK_TYPE_2. For example, the first type memory blocks BLK_TYPE_1 may be SLC memory blocks each including SLC memory cells, and the second type memory blocks BLK_TYPE_2 may be memory blocks each including MLC, TLC, or QLC memory cells.

The controller 120 may receive a write command WR_CMD from the outside of the storage device 100. An external device that transmits the write command WR_CMD to the controller 120 from the outside of the storage device 100 may be a host HOST described in FIG. 1.

The write command WR_CMD is a command requesting data to be written. The write command WR_CMD may indicate a logical address of data to be written and the size of the data. The controller 120 may receive data to be written after receiving the write command WR_CMD.

The controller 120 may write data requested by the write command WR_CMD to a first memory area MEM_AREA_1 or a second memory area MEM_AREA_2 of the memory 110.

The first memory area MEM_AREA_1 may include one or more of the first type memory blocks BLK_TYPE_1, and the second memory area MEM_AREA_2 may include one or more of the second type memory blocks BLK_TYPE_2.

Figure 4:
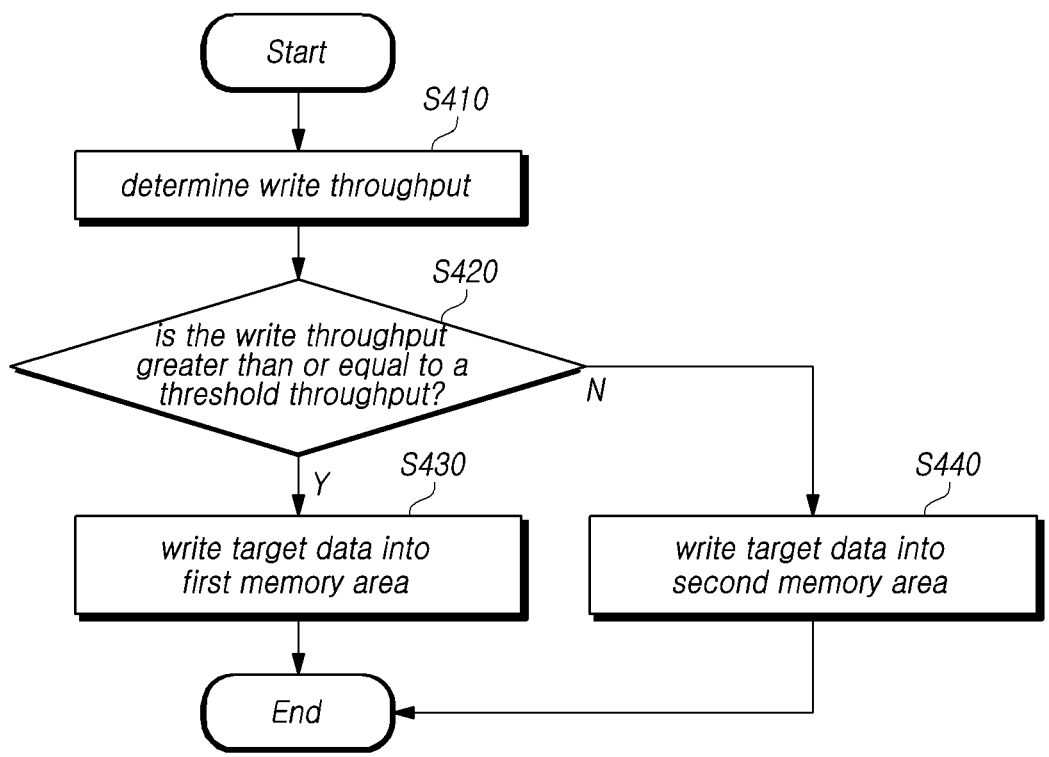
FIG. 4 is a flowchart illustrating an example of operation of a storage device according to an embodiment of the disclosure.

FIG. 4 is a flowchart illustrating an example of operation of a storage device according to an embodiment of the disclosure.

Referring to FIG. 4, a controller 120 of a storage device 100 may determine write throughput based on a plurality of write commands received from the outside (S410). The write throughput is an indicator of the performance of the storage device 100 to write data, and may be expressed as a value obtained by dividing the size of data by time.

The controller 120 determines whether the write throughput determined in the operation S410 is greater than or equal to a set threshold throughput (S420).

When the write throughput is equal to or greater than the threshold throughput (S420-Y), the controller 120 may write target data requested to be written from the outside into the first memory area MEM_AREA_1 (S430). The target data may be data requested by a plurality of write commands described in the operation S410 or data requested by a separate write command that is not included in the plurality of write commands.

On the other hand, when the write throughput is less than the threshold throughput (S420-N), the controller 120 may write the target data into the second memory area MEM_AREA_2 (S440).

When the write throughput is less than the threshold throughput, there is no significant difference in performance of the storage device 100, from an external perspective, even when the controller 120 does not store data in the first type memory blocks BLK_TYPE_1, which operate at a higher speed.

For example, when the write throughput is less than the threshold throughput, an external device requesting to write data to the storage device 100 may perform another task. The external device may alternately perform a read request and a write request, while the controller 120 executes garbage collection because the free space included in the first type memory blocks BLK_TYPE_1 is insufficient.

Thus, even if the controller 120 writes data requested from the outside into a second memory area MEM_AREA_2 instead of a first memory area MEM_AREA_1, write throughput performance requirements for the storage device 100 may be satisfied.

Accordingly, the controller 120 may prevent unnecessary garbage collection from being executed when the size of the free space of the first type memory blocks BLK_TYPE_1 is reduced because of data unnecessarily stored in the first type memory blocks BLK_TYPE_1. As a result, the controller 120 may reduce the size of data written in the memory 110 and may consume fewer resources, thereby preventing performance degradation and lifespan reduction of the storage device 100.

It has been described above that the controller 120 writes the target data requested to be written from the outside into the first memory area MEM_AREA_1 or the second memory area MEM_AREA_2 according to the write throughput.

Determination of the write throughput is described in the below embodiments.

Figure 5:
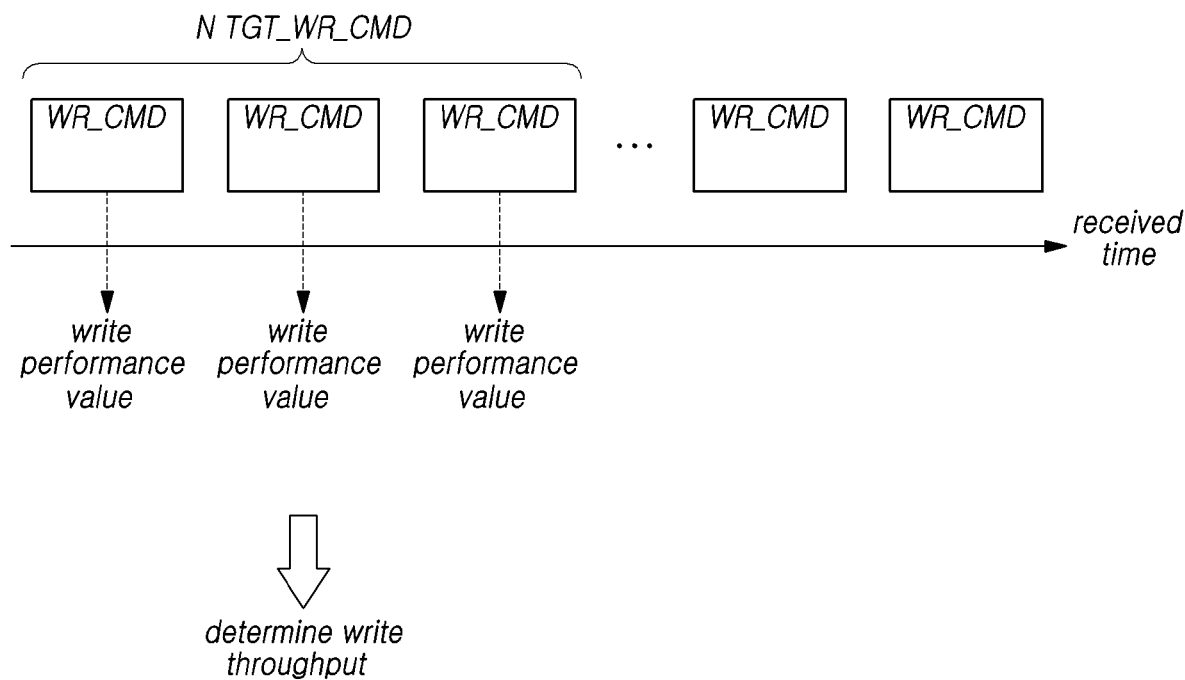
FIG. 5 is a diagram illustrating an example of an operation in which a storage device determines write throughput according to an embodiment of the disclosure.

FIG. 5 is a diagram illustrating an example of an operation in which a storage device determines write throughput according to an embodiment of the disclosure.

Referring to FIG. 5, a controller 120 of a storage device 100 may select N (where the N is a natural number greater than or equal to 2) target write commands TGT_WR_CMD from among a plurality of write commands WR_CMD.

The controller 120 may determine write performance values for the respective N target write commands TGT_WR_CMD. The write performance values for the respective N target write commands TGT_WR_CMD are indicators of the performance required by the respective N target write commands TGT_WR_CMD, and may be expressed as a value obtained by dividing the size of data requested by the target write command by time, similar to the write throughput.

The controller 120 may determine the write throughput based on an N number of write performance values for the respective N target write commands TGT_WR_CMD.

The controller 120 may select the N target write commands TGT_WR_CMD in various ways.

For example, as described with reference to FIG. 5, the controller 120 may select N write commands that are received first from among the plurality of write commands WR_CMD as the target write commands TGT_WR_CMD.

As another example, the controller 120 may randomly select the N target write commands TGT_WR_CMD from among the plurality of write commands WR_CMD.

As another example, the controller 120 may select the most recently received N write commands from among the plurality of write commands WR_CMD as the target write commands TGT_WR_CMD.

Thus, the N target write commands TGT_WR_CMD selected by the controller 120 may satisfy a specific condition. Hereinafter, this will be described in detail in FIG. 6.

Figure 6:
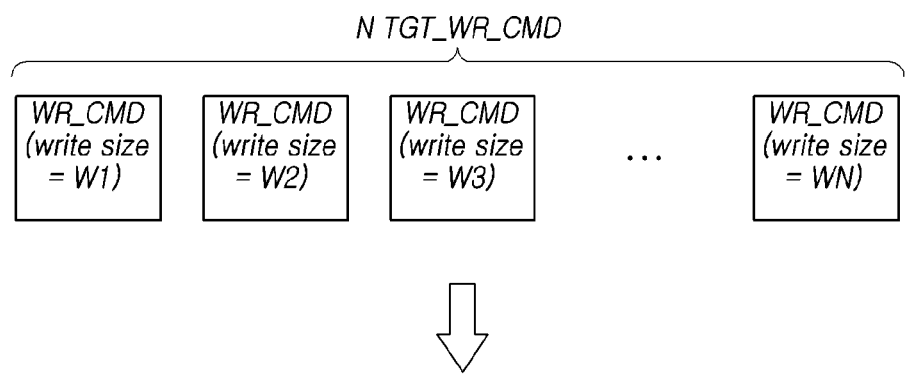
FIG. 6 is a diagram illustrating an example of total size of data requested by target write commands described in FIG. 5 according to an embodiment of the disclosure.

FIG. 6 is a diagram illustrating an example of total size of data requested by target write commands TGT_WR_CMD described in FIG. 5 according to an embodiment of the disclosure.

Referring to FIG. 6, data sizes requested by the N target write commands TGT_WR_CMD may be W1, W2, W3, . . . , WN respectively.

The total size of data requested by the N target write commands TGT_WR_CMD (i.e., W1+W2+W3+ . . . +WN) may be less than the size of a write buffer (not shown), to which data to be written in the memory is temporarily stored.

For example, the plurality of write commands WR_CMD may include 10 write commands requesting to write 4 KB data, 13 write commands requesting to write 64 KB data, and write command requesting to write 128 KB data.

In this case, if the size of the write buffer is 960 KB, then 10 write commands requesting to write 4 KB data and 13 write commands requesting to write 64 KB data may be determined as the target write commands TGT_WR_CMD so that the total size of data is less than or equal to 960 KB.

When the command requesting to write 128 KB data is included in the target write commands TGT_WR_CMD, however, the total data size exceeds 960 KB, which is the size of the write buffer. Accordingly, the write command requesting to write 128 KB data is excluded from the target write commands TGT_WR_CMD.

The aforementioned write buffer is an area for temporarily storing data to be written to the memory 110. For example, the write buffer may be set as a partial area of the working memory 125 described in FIG. 1 or as a separate non-volatile memory (e.g., SRAM) included in the controller 120.

The controller 120 may first accumulate and store data to be written in the memory 110 in the write buffer, and then write the data stored in the write buffer to the memory 110. The controller 120 may delete the data stored in the write buffer after the data stored in the write buffer is completely written in the memory 110.

That is, the controller 120 may select target write commands TGT_WR_CMD to satisfy a condition in which the total size of data requested by the target write commands TGT_WR_CMD is less than or equal to the size of the write buffer. This condition is important because it is difficult to accurately calculate write throughput when the write buffer is full, or when the total size of data requested by the target write commands TGT_WR_CMD is greater than the size of write buffer.

Hereinafter, a specific method of determining, by the controller 120, the write performance values for the N target write commands TGT_WR_CMD respectively will be described.

Figure 7:
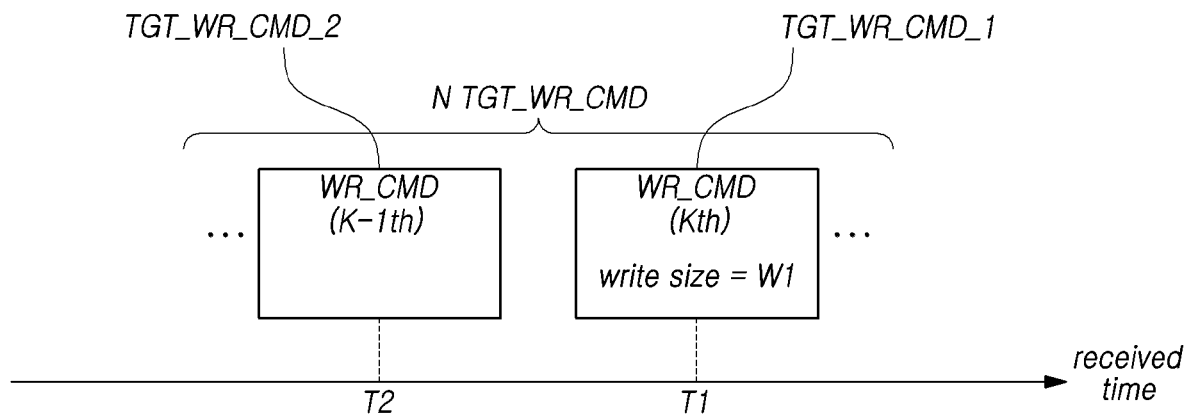
FIG. 7 is a diagram illustrating an example of an operation in which a storage device determines a write performance value of a first target write command from among target write commands according to an embodiment of the disclosure.

FIG. 7 is a diagram illustrating an example of an operation in which a storage device determines a write performance value of a first target write command from among target write commands according to an embodiment of the disclosure.

In FIG. 7, a first target write command TGT_WR_CMD_1 is the K-th target write command (where K is greater than or equal to 2 and less than or equal to N), from among N target write commands TGT_WR_CMD.

In this example, a controller 120 of a storage device 100 may determine the write performance value for the first target write command TGT_WR_CMD_1 as a value obtained by dividing the size W1 of data requested by the first target write command TGT_WR_CMD_1 by a time, T1–T2. Time T2 represents a time when a second target write command TGT_WR_CMD_2, which is received (K−1)-th among the N target write commands, is received. Time T1 represents a time when the first target write command TGT_WR_CMD_1 is received.

For example, when W1 is 256 KB, T2 is 300 μs, and T1 is 100 μs, the controller 120 may determine the write performance value for the first target write command TGT_WR_CMD_1 as size divided by time, or (256 KB)/((300−100) μs).

The write performance value of a first received target write command, from among the N target write commands TGT_WR_CMD, may also be determined by other methods.

For example, the write performance value of the first received target write command may be determined as a value obtained by dividing the size of write-requested data by a time from a preset reference time point to a time point when the first received target write command is received.

As another example, the write performance value of the first received write command may be determined by dividing the size of write-requested data by a predetermined unit or period of time.

Hereinafter, a method of determining, by the storage device 100, write throughput based on write performance values for the N target write commands TGT_WR_CMD respectively will be described.

Figure 8:
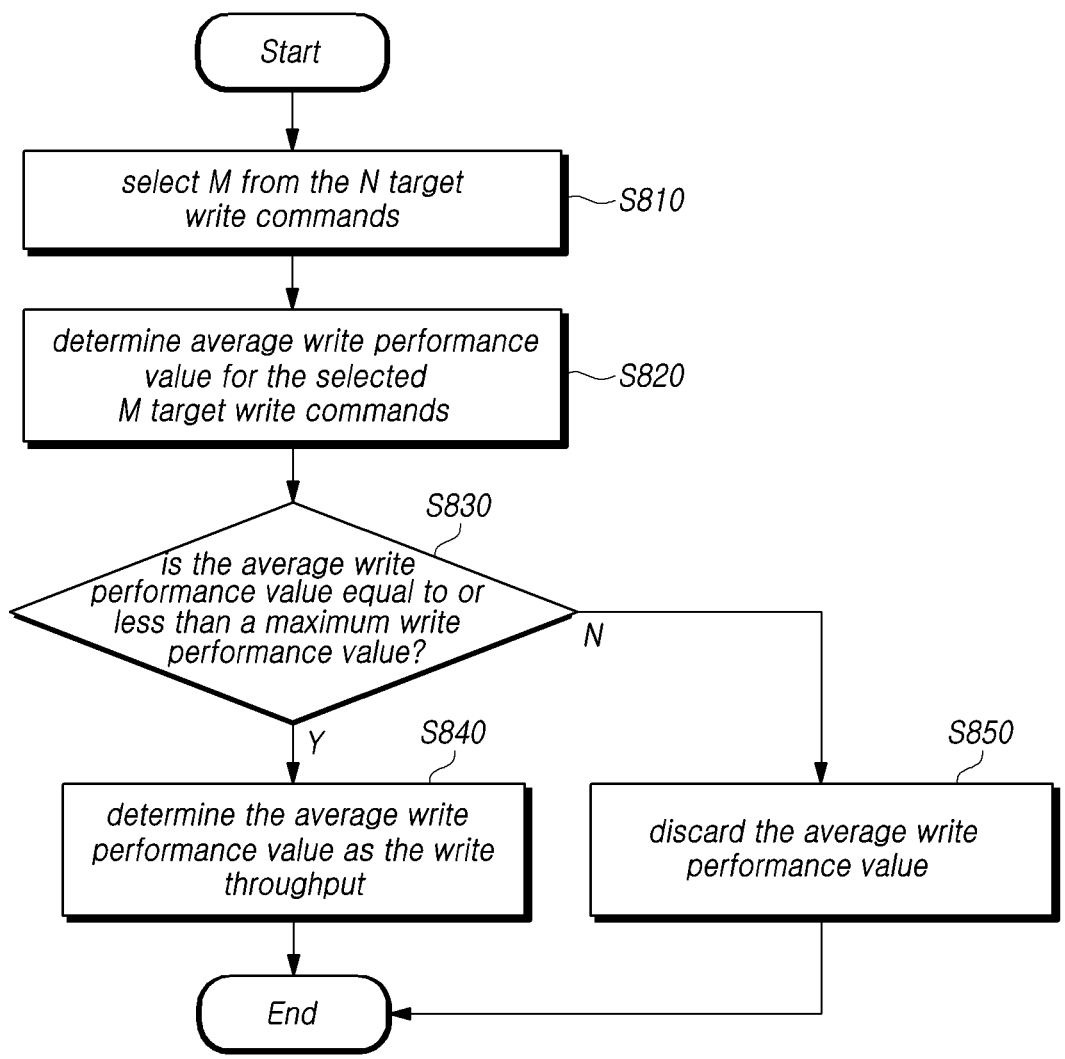
FIG. 8 is a flowchart illustrating an example of an operation in which a storage device determines write throughput based on an average write performance value according to an embodiment of the disclosure.

FIG. 8 is a flowchart illustrating an example of an operation in which a storage device determines write throughput based on an average write performance value according to an embodiment of the disclosure.

Referring to FIG. 8, a controller 120 of a storage device 100 may select an M (where M is a natural number less than or equal to N) number of target write commands from the N target write commands TGT_WR_CMD (S810).

Then, the controller 120 may determine the average write performance value for the selected M target write commands (S820).

The controller 120 determines whether the average write performance value determined in operation S820 is equal to or less than a set maximum write performance value (S830). The maximum write performance value means the maximum speed at which the controller 120 writes data to the memory 110.

When the average write performance value is less than or equal to the maximum write performance value (S830-Y), the controller 120 may determine the average write performance value as the write throughput (S840).

On the other hand, when the average write performance value exceeds the maximum write performance value (S830-N), the controller 120 may discard the average write performance value (S850). The average write performance value can be discarded because the average write performance value cannot exceed the maximum write performance value. When the average write performance value exceeds the maximum write performance value, an error has occurred in the process of determining the average write performance value, and so in this case, the controller 120 may re-determine M target write commands from among the N target write commands TGT_WR_CMD.

Figure 9:
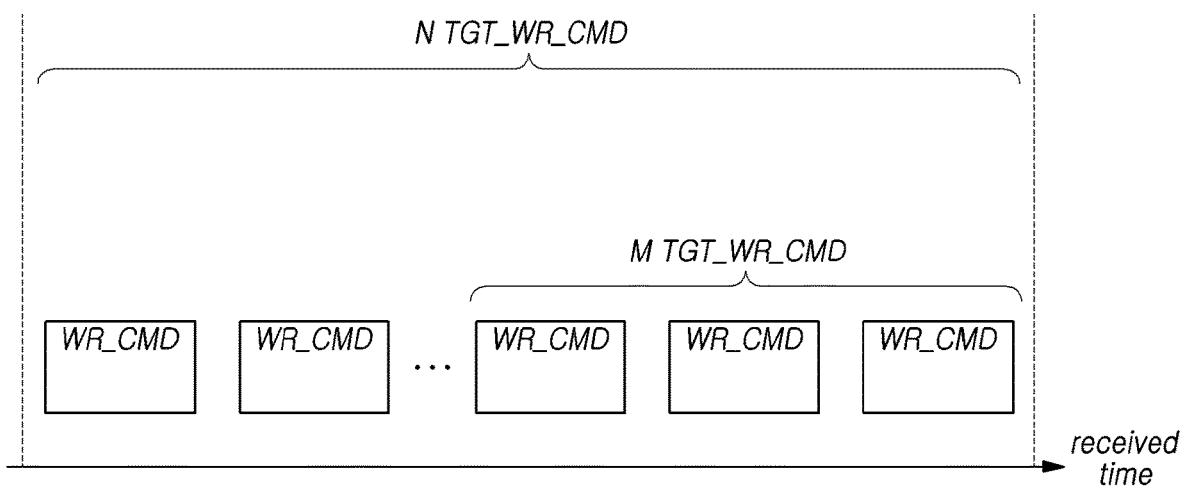
FIG. 9 is a diagram illustrating an example of an operation in which a storage device determines an average write performance value according to an embodiment of the disclosure.

FIG. 9 is a diagram illustrating an example of an operation in which a storage device determines an average write performance value according to an embodiment of the disclosure.

Referring to FIG. 9, a controller 120 of a storage device 100 may select an M number of last recently received write commands from among the N target write commands TGT_WR_CMD, and may determine the average of write performance values for the selected M write commands.

An operation in which the storage device 100 determines the write throughput based on the write performance value for the N target write commands TGT_WR_CMD respectively has been previously described.

Hereinafter, another method for determining write throughput by the storage device 100 will be described.

Figure 10:
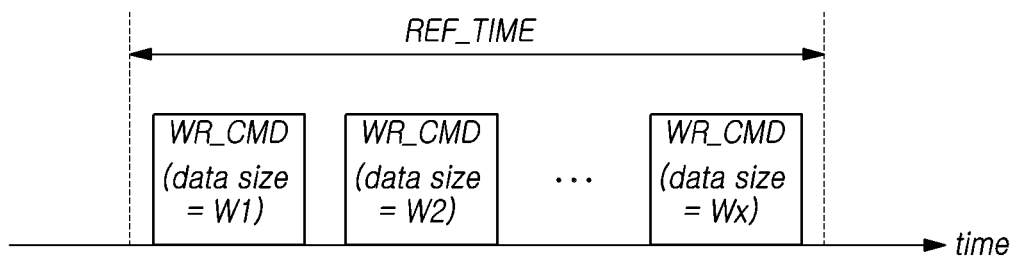
FIG. 10 is a diagram illustrating another example of an operation in which a storage device determines write throughput according to an embodiment of the disclosure.

FIG. 10 is a diagram illustrating another example of an operation in which a storage device determines write throughput according to an embodiment of the disclosure.

Referring to FIG. 10, a controller 120 of a storage device 100 may determine the write throughput based on a sum of the sizes of data (W1+W2+ ... +Wx) written to the memory 110, in accordance with the plurality of write commands WR_CMD, for a set reference time period REF_TIME.

The reference time period REF_TIME may be (1) an update period of a mapping table indicating mapping information between logical address and physical address or (2) an allocation period of a super memory block including one or more of a plurality of memory blocks included in the memory 110.

The controller 120 may update the mapping table whenever data of a certain size is written to the memory 110. Accordingly, the controller 120 may estimate the write throughput based on the update period of the mapping table.

Similarly, the controller 120 may additionally allocate a super memory block whenever data of a certain size is written to the memory 110. Accordingly, the controller 120 may predict the write throughput based on the allocation period of the super memory block.

An operation in which a storage device 100 stores write-requested data from the outside in the first memory area MEM_AREA_1 or the second memory area MEM_AREA_2 according the write throughput has been described above.

The storage device 100 may also store write-requested data from the outside in the first memory area MEM_AREA_1 or the second memory area MEM_AREA_2 using another criterion instead of the write throughput.

For example, the controller 120 of the storage device 100 may input one or more operating parameters (e.g., depth of the queue where write commands are queued, utilization of the write buffer, size of data copied during garbage collection) to a machine learning model (e.g., decision tree, random forest), and store target data requested from the outside to the first memory area MEM_AREA_1 or the second memory area MEM_AREA_2 based on a value outputted by the machine learning model.

The value outputted by the machine learning model may be a ratio of size of data to be written to the second memory area MEM_AREA_2 to the size of data to be written to the first memory area MEM_AREA_1.

The controller 120 may separately execute training on the machine learning model.

Figure 11:
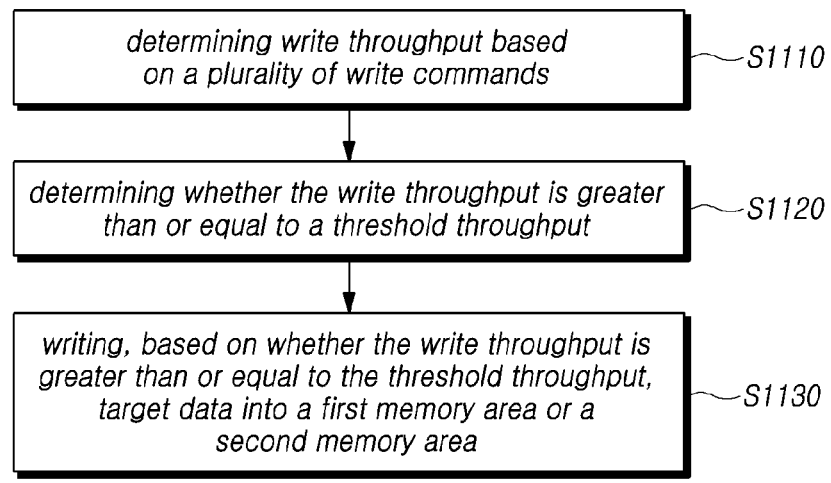
FIG. 11 is a diagram illustrating a method for operating a storage device according to an embodiment of the disclosure.

FIG. 11 is a diagram illustrating a method for operating a storage device according to an embodiment of the disclosure.

Referring to FIG. 11, a method for operating a storage device 100 may include determining write throughput based on a plurality of write commands WR_CMD received from the outside of the storage device 100 (S1110).

For example, the operation S1110 may include (i) determining N (where N is a natural number greater than or equal to 2) target write commands TGT_WR_CMD from among the plurality of write commands WR_CMD and (ii) determining the write throughput based on write performance values for the respective N target write commands.

For example, the total size of data requested by the N target write commands TGT_WR_CMD may be less than the size of a write buffer that stores data to be written to the memory 110.

For example, a write performance value for a first target write command TGT_WR_CMD_1, received K-th (where K is a natural number greater than or equal to 2 and less than or equal to the N) among the N target write commands TGT_WR_CMD, may be determined as a value obtained by dividing the size of data requested by the first target write command TGT_WR_CMD_1 by the time from when a second target write command TGT_WR_CMD_2, which is received (K−1)-th among the N target write commands TGT_WR_CMD, is received, to when the first target write command TGT_WR_CMD_1 is received.

For example, the determining the write throughput based on write performance values for the respective N target write commands TGT_WR_CMD may include (i) determining an average write performance value for M (where M is a natural number less than or equal to the N) of the N target write commands TGT_WR_CMD, and (ii) determining the average write performance value as the write throughput when the average write performance value is less than or equal to a set maximum write performance value.

In step (ii) above, the determining the average write performance may include determining an average of write performance values for M last recently received write commands among the N target write commands TGT_WR_CMD as the average write performance value.

As another example, the operation S1110 may determine the write throughput based on a sum of the sizes of data written to the memory 110 by executing the plurality of write commands WR_CMD for a set reference time period REF_TIME.

In this case, the reference time period REF_TIME may be an update period of a mapping table indicating mapping information between logical address and physical address, or an allocation period of a super memory block including one or more of a plurality of memory blocks included in the memory 110.

The method for operating the storage device 100 may include determining whether the write throughput determined in the operation S1110 is greater than or equal to a set threshold throughput (S1120).

The method for operating the storage device 100 may include writing, based on whether the write throughput is greater than or equal to the threshold throughput, target data requested from the outside into a first memory area MEM_AREA_1 or a second memory area MEM_AREA_2 (S1130).

In this case, the first memory area MEM_AREA_1 may include one or more of a plurality of first type memory blocks BLK_TYPE_1, and the second memory area MEM_AREA_2 may include one or more of a plurality of second type memory blocks BLK_TYPE_2. The first type memory blocks BLK_TYPE_1 may operate at a higher speed than the second type memory blocks BLK_TYPE_2.

Although exemplary embodiments of the disclosure have been described for illustrative purposes, those skilled in the art will appreciate that various modifications, additions and substitutions are possible, without departing from the scope and spirit of the disclosure. Therefore, the embodiments disclosed above and in the accompanying drawings should be considered in a descriptive sense only and not for limiting the technological scope. The technological scope of the disclosure is not limited by the embodiments and the accompanying drawings. The spirit and scope of the disclosure should be interpreted in connection with the appended claims and encompass all equivalents falling within the scope of the appended claims.

What is claimed is:

1. A storage device comprising:
a memory including a plurality of first type memory blocks and a plurality of second type memory blocks; and
a controller configured to:
determine write throughput based on a plurality of write commands received from outside of the storage device,
write target data requested from the outside into a first memory area including one or more of the first type memory blocks when the write throughput is greater than or equal to a threshold throughput, and
write the target data requested from the outside into a second memory area including one or more of the second type memory blocks when the write throughput is less than the threshold throughput,
wherein the first type memory blocks operate at a higher speed than the second type memory blocks,
wherein the controller is configured to determine the write throughput based on write performance values for respective N target write commands selected from among the plurality of write commands,
wherein the N is a natural number greater than or equal to 2,
wherein the controller is configured to determine a write performance value for a first target write command received K-th among the N target write commands as a value obtained by dividing a size of data requested by the first target write command by time from when a second target write command, which is received (K−1)-th among the N target write commands, is received to when the first target write command is received, and
wherein the K is a natural number greater than or equal to 2 and less than or equal to the N.

2. The storage device according to claim 1, wherein a total size of data requested by the N target write commands is less than a size of a write buffer that stores data to be written in the memory.

3. The storage device according to claim 1, wherein the controller is configured to determine an average write performance value for M target write commands from among the N target write commands and to determine the average write performance value as the write throughput when the average write performance value is less than or equal to a maximum write performance value, and wherein the M is a natural number less than or equal to the N.

4. The storage device according to claim 3,
wherein the controller is configured to determine an average of write performance values for an M number of last recently received, from the present, write commands from among the N target write commands as the average write performance value.

5. The storage device according to claim 1,
wherein the controller is configured to determine the write throughput based on a sum of sizes of data written to the memory according to the plurality of write commands for a reference time period, and
wherein the reference time period is an update period of a mapping table indicating mapping information between logical address and physical address or an allocation period of a super memory block including one or more of a plurality of memory blocks included in the memory.

6. A method for operating a storage device, comprising:
determining write throughput based on a plurality of write commands received from outside of the storage device;
determining whether the write throughput is greater than or equal to a threshold throughput;
writing, when the write throughput is greater than or equal to the threshold throughput, target data requested from the outside into a first memory area including one or more of a plurality of first type memory blocks; and
writing, when the write throughput is less than to the threshold throughput, target data requested from the outside into a second memory area including one or more of a plurality of second type memory blocks,
wherein the first type memory blocks operate at a higher speed than the second type memory blocks,
wherein determining the write throughput comprises:
determining N target write commands from among the plurality of write commands; and
determining the write throughput based on write performance values for the respective N target write commands,
wherein N is a natural number greater than or equal to 2,
wherein a write performance value for a first target write command received K-th among the N target write commands is determined as a value obtained by dividing a size of data requested by the first target write command by time from when a second target write command, which is received (K-1)-th among the N target write commands, is received to when the first target write command is received, and
wherein K is a natural number greater than or equal to 2 and less than or equal to the N.

7. The method according to claim 6,
wherein a total size of data requested by the N target write commands is less than a size of a write buffer that stores data to be written in the memory.

8. The method according to claim 6,
wherein determining the write throughput based on write performance values for the respective N target write commands comprises: determining an average write performance value for M target write commands from among the N target write commands;
determining the average write performance value as the write throughput when the average write performance value is less than or equal to a maximum write performance value; and
wherein M is a natural number less than or equal to the N.

9. The method according to claim 8,
wherein determining the average write performance determines an average of write performance values for an M number of last recently received, from the present, write commands from among the N target write commands as the average write performance value.

10. The method according to claim 6,
wherein determining the write throughput determines the write throughput based on a sum of the sizes of data written to the memory in response to the plurality of write commands for a reference time period, and
wherein the reference time period is an update period of a mapping table indicating mapping information between logical address and physical address or an allocation period of a super memory block including one or more of a plurality of memory blocks included in the memory.

11. A controller comprising:
a memory interface configured to communicate with a memory including a plurality of single level cell (SLC) memory blocks and a plurality of triple level cell (TLC) memory blocks; and
a control circuit configured to:
determine write throughput based on a plurality of write commands received from a host,
write data requested by the host to one or more of the SLC memory blocks when the write throughput is greater than or equal to a threshold throughput, and
write data requested by the host to one or more of the TLC memory blocks when the write throughput is less than the threshold throughput,
wherein the control circuit is configured to determine the write throughput based on write performance values for respective N target write commands selected from among the plurality of write commands,
wherein the N is a natural number greater than or equal to 2,
wherein the control circuit is configured to determine a write performance value for a first target write command received K-th among the N target write commands as a value obtained by dividing a size of data requested by the first target write command by time from when a second target write command, which is received (K-1)-th among the N target write commands, is received to when the first target write command is received, and
wherein the K is a natural number greater than or equal to 2 and less than or equal to the N.

* * * * *